Figure 1:
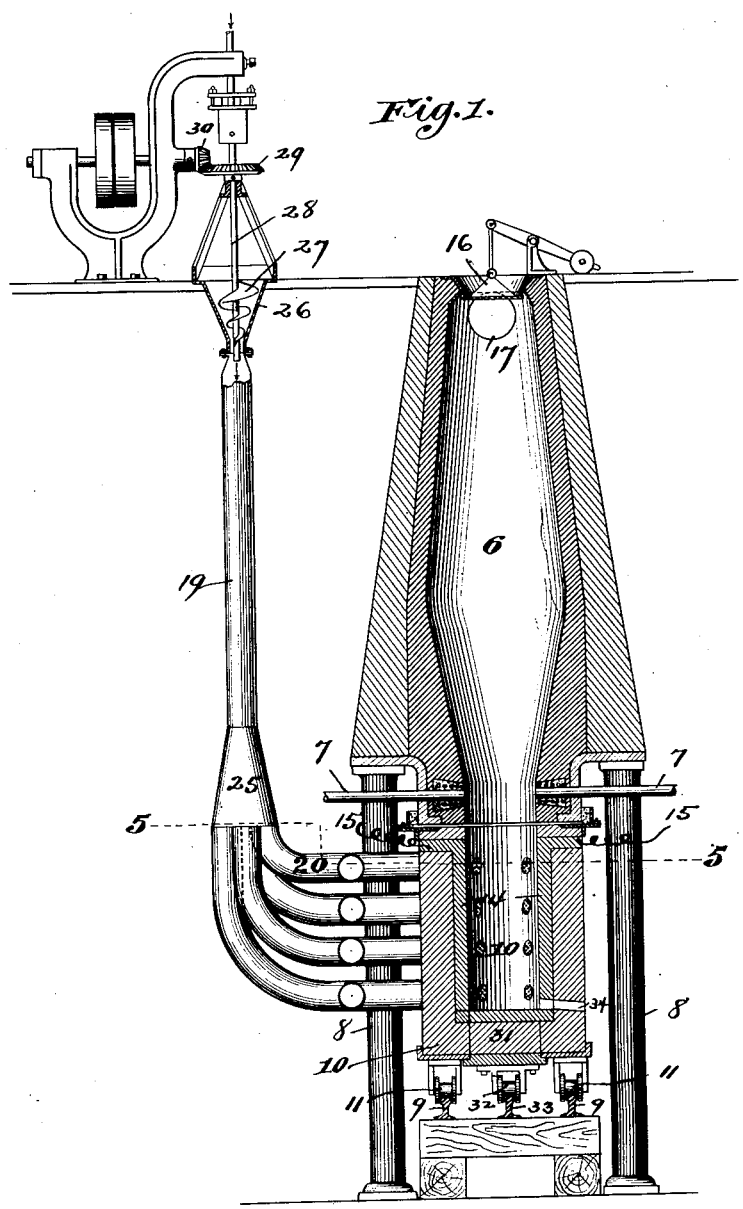

(No Model.) 4 Sheets—Sheet 1.

H. L. HARTENSTEIN.
PROCESS OF AND APPARATUS FOR CARBURETING CALCIUM.

No. 594,740. Patented Nov. 30, 1897.

Witnesses,

Inventor, (No Model.) 4 Sheets—Sheet 2.
H. L. HARTENSTEIN.
PROCESS OF AND APPARATUS FOR CARBURETING CALCIUM.
No. 594,740. Patented Nov. 30, 1897.
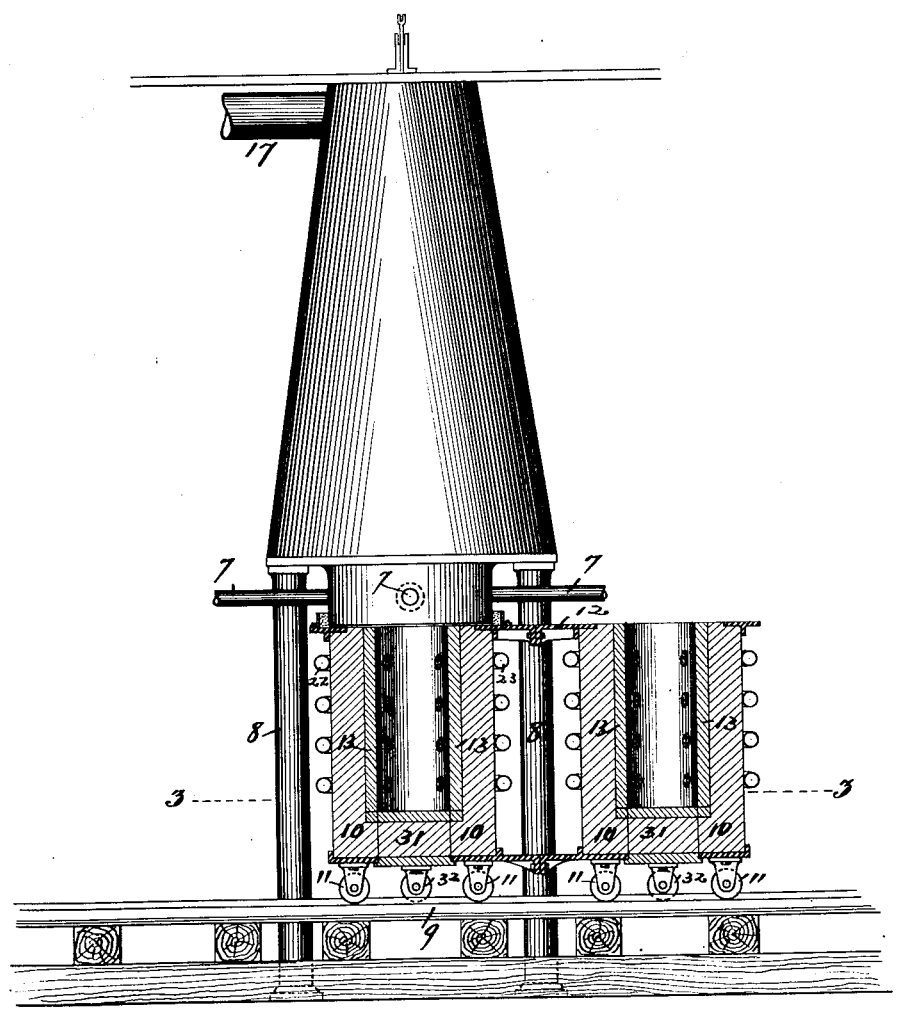

(No Model.) 4 Sheets—Sheet 3.
H. L. HARTENSTEIN.
PROCESS OF AND APPARATUS FOR CARBURETING CALCIUM.
No. 594,740. Patented Nov. 30, 1897.
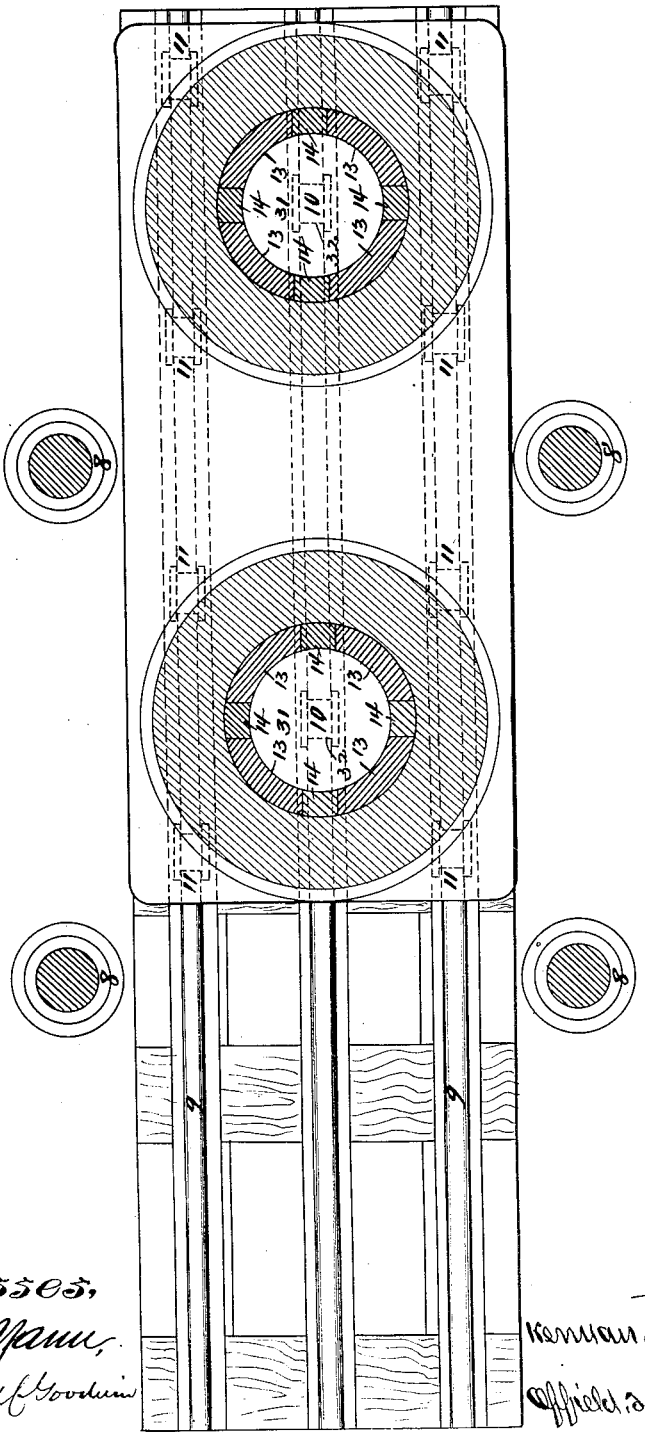

(No Model.) 4 Sheets—Sheet 4.

H. L. HARTENSTEIN.
PROCESS OF AND APPARATUS FOR CARBURETING CALCIUM.

No. 594,740. Patented Nov. 30, 1897.

Witnesses.
Inventor,
Herman L. Hartenstein

UNITED STATES PATENT OFFICE.

HERMAN L. HARTENSTEIN, OF BELLAIRE, OHIO.

PROCESS OF AND APPARATUS FOR CARBURETING CALCIUM.

SPECIFICATION forming part of Letters Patent No. 594,740, dated November 30, 1897.

Application filed January 7, 1896. Serial No. 574,661. (No model.)

*To all whom it may concern:*

Be it known that I, HERMAN L. HARTENSTEIN, of Bellaire, Ohio, have invented certain new and useful Improvements in Processes of and Apparatus for Carbureting Calcium, of which the following is a specification.

This invention relates to the carbureting of limestone; and its object is to provide a process and apparatus by means of which the carbureting of limestone may be carried out on a commercial basis—*i. e.*, with such economy of working and upon such a scale as to make the same commercially practicable.

My process consists, essentially, in the treatment of crude limestone by a series of successive steps whereby certain impurities of the limestone are driven off and the product is then, before parting with its heat, mixed with comminuted or pulverized coke in the presence of a gas or other hydrocarbon fuel between the poles of an electrical circuit, the result being the combination of the carbon of the coke with the calcium of the limestone, and thereby the carbureting of the calcium of the limestone. The chemical reactions by which the carbon of the gas enters into combination with the lime vary according to the chemical composition of the gas used. Ordinary illuminating-gas is suitable. As there is present an excess of carbon in the form of coke, the oxygen liberated by the decomposition of the lime in the electric furnace unites with the carbon and hydrogen, producing carbon-monoxid and some carbonic-acid gas, and also, at the high temperature employed, some acetylene. The calcium freed from its oxygen combines with the excess of carbon, and thereby the calcium is carbureted.

The apparatus consists in the preferred form of a furnace the upper portion of which has a chamber in which the crude limestone mechanically mixed with a sufficient quantity of coke to calcine the same is placed, and provision is made for supplying air under pressure to facilitate combustion. This calcining-chamber opens at its lower end into a second or smelting chamber, into which the calcined limestone feeds down by gravity. Arranged in the walls of this second chamber are electrodes forming elements of an electrical circuit. Into this calcined limestone while contained within the second chamber is forced a suitable proportion of pulverized coke, preferably by the aid of a combustible gas, the gas serving as the vehicle to carry the particles of coke and its pressure furnishing the required force to secure their incorporation with the mass of burned limestone. The particles of pulverized coke being thus intimately mixed with the limestone serve as conductors through which the electrical current passes, the particles of lime acting to obstruct or resist the passage of the current, thus generating and maintaining an intense heat and rendering the mass incandescent. The gas serving as the vehicle for the injection of the pulverized coke is also consumed, adding to the heat and furnishing a constant supply of the combustible ingredients.

From the foregoing brief description it will be seen that my process is characterized by the fact that the operation upon the limestone is continuous, and that it is at no time allowed to become cool during the treatment. A further distinguishing characteristic is the combined effect of the electrical current and of the solid and gaseous fuel as heating agents upon such limestone, whereby the same is highly impregnated with carbon and at such cost and with such rapidity of operation as to make the same commercially practicable.

The invention so far as the apparatus is concerned relates to the novel construction and combination of its several parts, as hereinafter described, and particularly pointed out in the claims.

Figure 4:
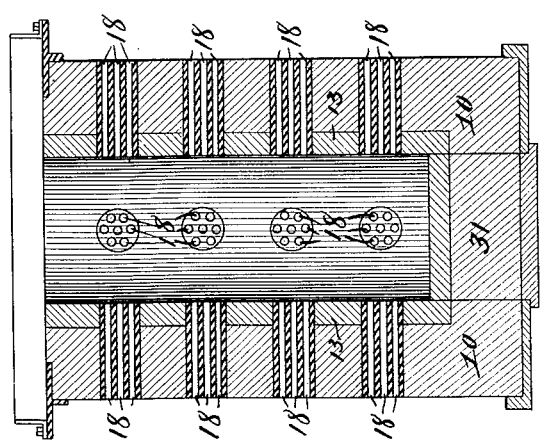

In the accompanying drawings, showing the preferred form of apparatus, Figure 1 is an elevation sectional through the furnace and through a portion of the feeding apparatus. Fig. 2 is an elevation at right angles to the view shown in Fig. 1 and sectional through the smelting-chamber of the furnace, which is made movable and in duplicate. Fig. 3 is a sectional plan view on the line 3 3 of Fig. 2. Fig. 4 is a vertical sectional view through the smelting-chamber of the furnace, and Fig. 5 is a sectional plan below the line 5 5 of Fig. 1.

In carrying out my process with the apparatus shown in the accompanying drawings I fill the chamber 6 with broken limestone intermingled with such quantity of coke or other solid fuel as will be sufficient to highly heat or calcine such limestone. The conformation of this chamber may be as usual, and at its base is provided with the twyers 7 for introducing an air-blast. The walls of this upper chamber may be conveniently supported upon the columns 8, between which are arranged the track-rails 9. Upon these track-rails the base-section or smelting-chamber 10 of the furnace is adapted to be moved, being provided with the wheels 11 to facilitate such movement. In order to expedite repairs or renewals to the base-section of the furnace, which is subjected, of course, to the highest degree of heat, I prefer to form duplicate sections, as shown in Figs. 2 and 3, each mounted upon wheels adapted to the track-rails and connected at the top by the plate 12, which serves as a cut-off for the material in the chamber 6 when moving one of the base-sections out of line and the other into line with relation to such upper chamber. The interior walls of the base-section 10 are formed by the linings 13 and the electrodes 14. The latter constitute the poles of an electrical circuit, elements of which are indicated by the broken wires 15. It will be understood that these wires lead to a suitable source of electrical current. The top of the chamber 6 may be provided with the adjustable damper 16, and near its top the wall is pierced by the discharge-pipe 17, by way of which the gases liberated by the burning of the limestone pass off. The external walls and lining-sections of the lower portion of the furnace are pierced by feed-apertures formed of cylinders, each of which is preferably subdivided to form a series of longitudinal apertures 18. The arrangement of these cylinders is indicated in Figs. 4 and 5, being shown as piercing the walls at different elevations, and arranged in four horizontal series of four members each. Each series is in communication through branch pipes with a supply-pipe leading to a trunk 19.

Figure 5:
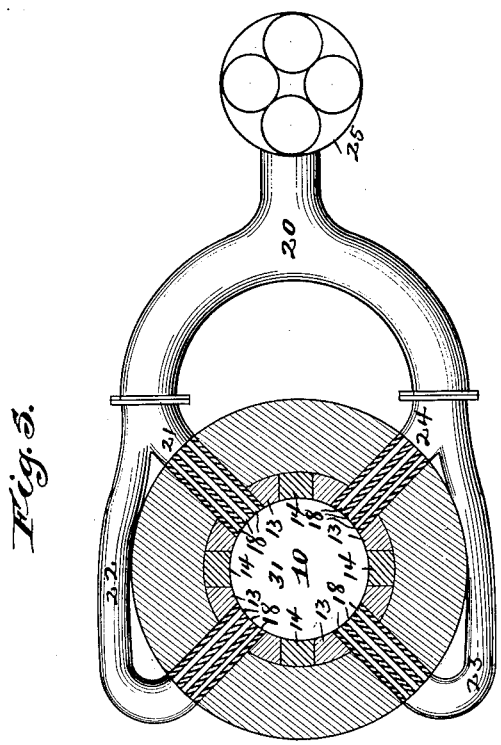

By reference to Fig. 5 one of these feed-pipes, (marked 20,) with branches 21 22 23 24, is shown, while the mouths of the remaining feed-pipes are indicated in the boot 25 of the trunk 19. The upper end of the trunk 19 communicates with a hopper 26, within which a screw 27 is mounted on a rotating hollow shaft or pipe 28, the latter serving to introduce a gas into the trunk 19. The hollow shaft or pipe 28 is provided with gears, as 29 30, to cause its rotation. The bottom wall 31 of the lower portion 10 of the furnace may be supported on a traveler 32, adapted to a rail 33, located between the rails 9, and such bottom wall may therefore conveniently be removed at any time to afford access to the base of the smelting-chamber.

The complete operation involving the use of my process and the above-described apparatus for carrying the same into effect is as follows: Limestone, crushed or broken into pieces of suitable size for treatment, and a suitable proportion of coke or other solid fuel are charged into the chamber 6, the movable base-section being preferably in such position as that the table 12 shall close the base of said chamber. The limestone is calcined in this chamber, and then the base-section of the furnace is moved so as to bring one of the smelting-chambers into communication with the chamber 6, whereupon the burnt lime in a highly-heated condition will feed down into the base-chamber by gravity. The material is thus brought between the electrodes. The carbon-supplying material is then introduced, and preferably in the form of finely-pulverized coke, the same being fed down through the hopper and picked up by the gas flowing through the pipe 28 under high pressure. This gas therefore serves as a vehicle to carry and force the pulverized coke through the apertures of the feed-pipes and thoroughly intermingle the same with the limestone. The electrical current being turned on will find in the molecules of pulverized coke a more or less perfect conductor, depending upon the particular arrangement of said molecules with reference to the mass under treatment. The limestone having low conductivity offers resistance to the passage of the electrical current, and there is thereby produced an almost infinite number of arcs generating heat and rendering the mass highly incandescent. The commingled coke and its gaseous vehicle also furnish heat elements, and the result is the generation of an intense heat, which rapidly and economically effects the reduction of the limestone, highly carbureted, into a molten mass, which may be withdrawn through the tap-hole 34 at the base of the chamber.

It will be observed that my process and apparatus secure not only a high efficiency, but also great economy, because of the fact that all of the heat produced is utilized. The limestone feeding down into the lower chamber by gravity reaches the base of the chamber in a highly-heated condition, where it is subjected to the electrical current, thus conserving heat, while, on the other hand, the heat produced in the smelting operation, due to the combined action of the electrical current and the combustion of the solid and gaseous fuel, is not wasted, but, on the contrary, ascending through the mass of crude limestone assists in the raising of its temperature and therefore in conserving heat energy.

Another highly important feature of my invention consists in the continuous, regular, and effective supply of the combustible agent to and incorporating it with the mass of lime in the smelting-chamber.

Difficulties have been encountered in these operations where it has been attempted to mechanically mix lime with pulverized coke and to convert the calcium of the lime into carbid of calcium because of the difficulty of securing a regular and even feed of the lime between the poles of the electrical current. The lime being of very low conductivity offers such resistance to the passage of the electrical current as to produce a mass resembling slag, which can be removed only with great difficulty, thus rendering the operation very slow and sometimes causing a suspension or complete interruption until the furnace can be cleaned. With my improved process and apparatus a continuous and therefore profitable working may be secured.

The particular construction of my apparatus renders comparatively easy the repair or renewal of its parts and renders the original charging of the furnace easy of accomplishment.

While I have described my process as comprehending in the best method of working the calcining of the limestone and its smelting by the aid of the electrical current in conjunction with the combustion of the solid and gaseous fuels as a continuous operation, still it is evident that if the limestone were treated in a separate apparatus and charged into the smelting-chamber, there impregnated with the carbonaceous and gaseous materials and subjected to the electrical current, the essential features of my process would be employed, although at greater expense, because of the waste of heat due to the fact that the limestone is permitted to cool after calcination, and to the further waste of electrical energy due to the necessity of regaining such temperature. This might to some extent be compensated for by separately heating the lime before charging it into the smelting-furnace.

I claim—

1. The herein-described process of carbureting calcium, which consists in calcining limestone and then forcing into the calcined mass while in a heated condition a carbonaceous material by the aid of a combustible gas under pressure and simultaneously subjecting the mass to the action of an electrical current, substantially as described.

2. The herein-described process of carbureting calcium, which consists in mixing raw limestone with a solid fuel and firing the same whereby to drive off its carbon dioxid, then forcing into the calcined stone a pulverized carbonaceous material and simultaneously treating the mass with an electrical current, substantially as and for the purpose described.

3. The herein-described process of carbureting calcium, which consists in mixing the limestone with a solid fuel, firing the mass to drive off its carbon dioxid in the presence of an air-blast, then forcing into the calcined stone while heated a carbonaceous material and simultaneously subjecting the mass to the action of an electrical current, substantially as and for the purpose described.

4. The herein-described continuous process of carbureting calcium, which consists in mixing raw limestone with a solid fuel and firing the mass in the presence of an air-blast, then passing the calcined stone in a heated condition between two electric poles and simultaneously forcing into the calcined stone a carbonaceous material by the aid of a combustible gas under pressure and subjecting the mass to the action of an electrical current, substantially as described.

5. The herein-described apparatus, comprising a furnace having a calcining-chamber and a smelting-chamber, the latter having separated electrodes arranged in its walls, feed-pipes perforating said walls and arranged in horizontal series, a plurality of branch pipes connecting with said feed-pipes and a trunk connecting with the several branches and means for forcing a pulverized carbonaceous material through said trunk, the branches thereof and the several feed-pipes into the smelting-chamber, substantially as described.

6. In a smelting-furnace, the combination with a smelting-chamber having separated electrodes arranged in its inner walls, pipes or passages piercing said walls, branch pipes communicating with the outer ends of said feed pipes or passages, a trunk communicating with the several branches, and means for delivering a carbonaceous material into said trunk and a means for delivering a gaseous vehicle under pressure into the trunk whereby to carry the pulverized carbonaceous material into the furnace, substantially as described.

7. In an electric smelting-furnace the combination with a calcining-chamber supported in an elevated position and having an open bottom, of a plurality of smelting-chambers each open at its upper end and capable of being moved into and out of operative relation to the calcining-chamber and each having electrodes in its walls, substantially as described.

8. In a smelting-furnace, the combination with an upper portion supported in an elevated position, a horizontal track extending beneath said elevated portion and a plurality of base-sections each containing a chamber, said base-sections being connected by a table at their upper ends and adapted to be shifted into and out of line with the upper elevated portion as desired, substantially as described.

9. In an electric smelting-furnace the combination with a calcining-chamber supported in an elevated position, of a track arranged beneath said elevated portion and between its supports and a base portion movably mounted on said track, electrodes mounted in the walls of the movable portion and pipes or passages opening into the chamber thereof adjacent to the electrodes, substantially as described.

HERMAN L. HARTENSTEIN

Witnesses:
FREDERICK C. GOODWIN,
L. F. MCCREA.